Sept. 30, 1969   E. R. ROSSI ET AL   3,469,997
METHOD OF PRODUCING HANDLE-ANCHORED FORMED SUGAR BLOCK
Filed Dec. 6, 1966   2 Sheets-Sheet 1

INVENTOR.
EMIL R. ROSSI
BY ALDO A. RAINERO JR.
ATTORNEY

Sept. 30, 1969  E. R. ROSSI ET AL  3,469,997
METHOD OF PRODUCING HANDLE-ANCHORED FORMED SUGAR BLOCK
Filed Dec. 6, 1966  2 Sheets-Sheet 2
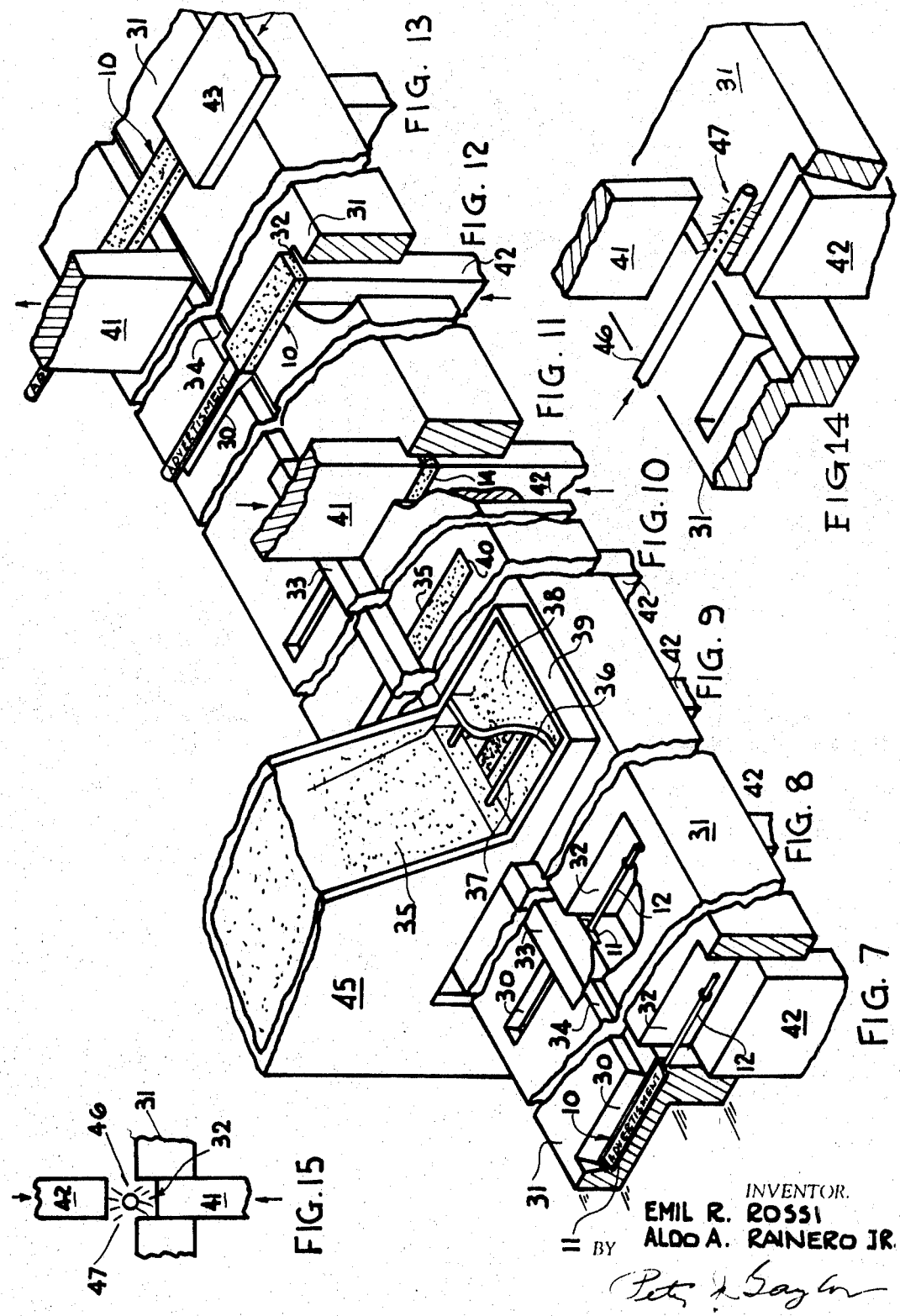
INVENTOR.
EMIL R. ROSSI
ALDO A. RAINERO JR.
BY
ATTORNEY United States Patent Office 3,469,997
Patented Sept. 30, 1969

3,469,997
METHOD OF PRODUCING HANDLE-ANCHORED FORMED SUGAR BLOCK
Emil R. Rossi, 71 Windom Ave. 10305, and Aldo A. Rainero, Jr., 810 Henderson Ave. 10310, both of Staten Island, N.Y.
Continuation-in-part of application Ser. No. 455,274, May 12, 1965. This application Dec. 6, 1966, Ser. No. 599,450
The portion of the term of the patent subsequent to Apr. 4, 1984, has been disclaimed
Int. Cl. A23g 3/00; C13f 3/00
U.S. Cl. 99—138     1 Claim

ABSTRACT OF THE DISCLOSURE

A process for pressure forming sugar blocks around wooden sticks, having one end with a cylindrical shape, for use as a sweetener and stirrer, comprising (1) placing the cylindrical end of the stick in a die coated with a film of lubricant, (2) pouring into the die a dry mixture of can sugar crystals containing about 3% to 20% by weight of dry sugar crystals in needle crystal form, and (3) compressing said mixture around said stick to yield a sugar block of a hardness of about 10 kg. as determined by the Strong Cobb-Arner hardness tester.

DISCLOSURE

Figure 1:
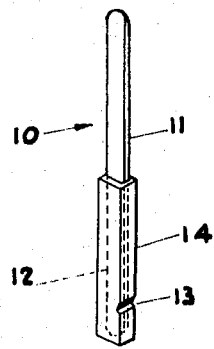

This application is a continuation-in-part of copending application Ser. No. 455,274 now Patent No. 3,312,555, filed on May 12, 1965 by Emil R. Rossi and Aldo A. Rainero, Jr.

This invention deals with a shaped block of sugar which is designed to serve as a stirrer for beverages, and to the method of producing same. More specifically, it relates to a shaped block of sugar of specific composition, in which is imbedded, substantially therethrough, a specially-shaped stick, the latter terminating, externally of the block, as a stirring handle for said sugar.

At the present time, restaurants, food stands, and similar food outlets which serve beverages, such as tea, coffee, chocolate, and the like, serve sugar in the form of a granulated powder, or as molded cubes. These are kept in a container, and a spoon may be provided with the sugar and beverage, for stirring. Not only does this type of serving involve the washing and drying of spoons and sugar containers, but it also incurs loss, through pilferage or damage, of such containers and spoons, as well as the loss of excessive amounts of sugar cubes, when these are served in containers. By means of the present invention, such difficulties have been eliminated.

In the prior art, there have been disclosed various packages and bags containing portions of sugar, as well as straws and perforated metal containers, holding sugar, and intended for individual use. None of these have been able to eliminate the difficulties set forth hereinabove. Also, there have been disclosed various eating utensils and shaped wooden sticks, coated with or embedded in molded and/or frozen confections, such as candy or ice cream. However, the fact still remains that, although such proposals have been made decades ago, it still is a fact that, at present, a customer is given a spoon and separate sugar portions when he orders a beverage in an eating establishment. Wooden spoons have been introduced in an attempt to overcome some of the troubles heretofore mentioned but, due to their cost and ineffectiveness, they have been discontinued in practically most cases.

There has also been proposed a block of sugar shaped like a spoon, in the top of which is inserted the tip of a flat wooden stick. Although it was intended that such spoon be used to stir the beverage until the sugar is dissolved, it has been found that as soon as the liquid beverage becomes absorbed in the block of sugar, the weight of the block, plus the weakening of the block structure through water saturation, caused the block to break off at the handle end portion almost immediately as soon as the stirring commenced.

Molded blocks of sugar have been and are being made commercially by a molding process which involves mixing specially-boiled white sugar with a controlled amount of heavy white syrup to form a self-supporting magma which is set out in molds to stand for some time. A further crystallization of sugar takes place which cements the grains together into a cemented mass, while the uncrystallized syrup drains off. These blocks are dried and packaged. Unfortunately, such a method is impractical for the purposes of this invention since it is slow and laborious.

There have been attempts made to pressure-form sugar blocks around flat wooden sticks, but these have resulted in failure, due to the crumbling of the sugar when such technique of forming is practiced. In attempting to find a suitable composition and process, it was found that sugar crystals cemented by magma or by conventional gummy binders did not result in satisfactory pressed blocks, due to sticking of the material to the punches and dies.

Ordinary cane sugar (sucrose) will not, by itself or with lubricants, press form into self-supporting blocks. However, it has been found that if the sucrose, which is in the form of monoclinic crystals, is admixed with a small amount, say about 3% to about 20%, by weight, of a sugar which crystalizes in needle forms, such as dextrose (glucose) or levulose (frutose), then it is possible to pressure-form the composition into strong, self-supporting, dense blocks.

The aforesaid sugar composition is pressure-formed into such strong, self-supporting dense blocks, using a pressure of about 3 to about 15 tons per square inch. In this case, the dry needle crystals are not cemented to the dry sucrose particles. Rather, they appear to serve as a structural framework which, under pressure, serves to enclose the monoclinic sucrose crystal particles. A solid and dry invert sugar, which generally consists of about equal parts of dextrose and levulose, is particularly suitable as the source of needle crystals for the purposes of the present invention.

Although there would normally be added to the composition about 0.2% to about 10% of an internal lubricant, such as an edible alkaline earth stearate, e.g., calcium or magnesium stearate, in the present invention, however, the lubrication is done externally, i.e., the die or mold parts in which the sugar block is formed, are provided intermittently with a thin film of lubricant to prevent sticking of the sugar composition to the parts. This may be done by spraying a suspension of, say finely powdered magnesium stearate in a volatile liquid, such as alcohol, prior to introduction into the dies of the sugar composition to be pressure formed. A suspension of about 3% to 10%, by weight, of magnesium stearate in ethyl or isopropyl alcohol is a suitable spray for this purpose.

Another method for lubricating externally is to alternately feed a magnesium stearate powder into the dies, then pressure form the powder, discharge the block of stearate thus formed, and then introduce the sugar composition to be pressure formed. The thin film of stearate left on the die parts adequately serves as a lubricant for that particular charge, and the operation is then repeated. The stearate blocks thus formed are reground into a fine powder and are recycled in the process.

It will be noted that, in this type of lubrication, the sugar block thus pressure formed will have a very thin coating of stearate particles on its surface. This thin coating serves a very useful purpose in that it tends to prevent sticking together of the formed blocks before they are wrapped. It also serves as a water vapor barrier against absorption of water by the block.

Attempts to pressure form such a composition around a flat stick did not result in a successful product, either due to flexing of the flat surface of the stick, upon release of the pressure, or to the inability of the sugar crystals to "set," into a permanent position on the flat surface, or to some other unknown effect. Finally, it was found that a suitable block of sugar could be pressure formed with the aforesaid composition in conjunction with a stick, provided a cylindrically-shaped stick were used in the sugar block. The elimination of flat surfaces in the pressure-forming areas enabled the production of a formed self-supporting block having a Strong Cobb-Arner hardness of up to 60 kg., or a Stokes hardness of up to 25 kg. A handle-anchored molded sugar is considered to be suitable for commercial use if it possesses a hardness of at least 10 kg., or preferably 25 kg. on the Strong Cobb-Arner hardness testing machine.

According to the present invention, a cube, or other formed shape, of sugar is pressure-formed around a cylindrical stick. The stick is positioned so that it extends substantially through the entire length of the block of sugar, so that it serves as a reinforcement therefor and prevents breaking off of large pieces which would drop to the bottom of the beverage container. The embedded portion of the stick preferably is provided with at least one portion of the stick preferably is provided with at least one peripheral rib which serves to prevent slipping off of the entire block. The handle portion of the stick is preferably flat, so as to be easily gripped and manipulated with the fingers. The block of sugar may have any shape desired, and it may have notches or other indicia to indicate teaspoonfuls, or portions thereof, of sugar.

Figure 2:
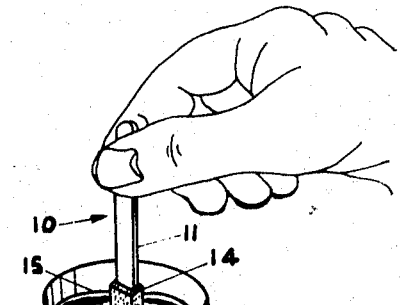
Figure 3:
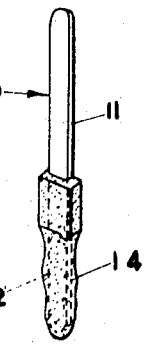
Figures 4, 5, 6:
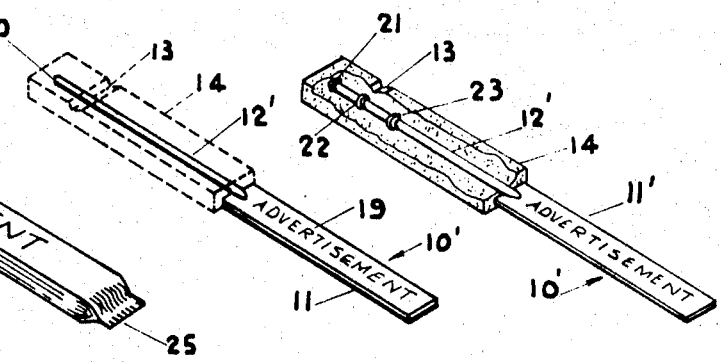

The invention will be more readily understood by reference to the accompanying drawings, in which a preferred embodiment is described, and in which FIGURE 1 illustrates, by a perspective side view, a wooden stick of the present invention carrying, on its bottom portion, a block of pressure-formed sugar. FIGURE 2 shows a similar view, wherein the stick is employed for stirring a beverage, while FIGURE 3 presents a similar view of the same stick after being removed from the beverage, while all of the sugar has not been completely dissolved, showing the uniformity in solubility and the lack of breaking off of portions of the block. FIGURE 4 depicts a similar view of the stirring stick of FIGURE 1, in wrapped and sterile condition. FIGURE 5 illustrates a similar view of a similar stick (with a phantom view of the block, wherein the stick is rounded in shape within the pressure-formed block, while FIGURE 6 depicts a similar view, with the pressure-formed sugar block partly broken away, to reveal the round stick provided with peripheral ribs.

FIGURES 7–13 present schematically the various steps employed in making a pressure-formed handle-anchored sugar block of the present invention. FIGURE 7 illustrates the positioning of the stick in the die cavity. FIGURE 8 illustrates how the handle portion of the stick is sealed off prior to filling, and FIGURE 9 depicts the scraping off of excess sugar by a doctor blade. The filled die cavity, ready for the pressure die is shown in FIGURE 10, while FIGURE 11 depicts the pressure die at the end of its downward stroke. In FIGURE 12, the pressure-formed handle-anchored block is raised out of the cavity and, in FIGURE 13, the product is pushed away out of the press making the latter ready for the next cycle. In FIGURE 14, there is depicted the manner of lubricating the die or mold portions by inserting a tube sprayer which sprays the lubricant composition over the die parts, preferably prior to the step shown in FIGURE 7. FIGURE 15 illustrates a side view of the essential parts at right angles to the view shown in FIGURE 14. The same numerals refer to similar parts in the various figures.

Referring again to the drawings, numeral 10 indicates generally a stick made of wood, plastic, or other suitable material, having a preferably flat upper handle portion 11, and a lower cylindrically-shaped sugar-anchoring portion 12. If desired, a notch 13 may be formed in the sugar block 14 to indicate a unit or partial spoon unit of sugar, as measured from the bottom of block 14.

It will be noted that the anchoring portion 12 of stick 10 extends substantially through the entire length of sugar block 14, so that when stick 10, disposed within the sugar block 14, is used to stir liquid beverage 15 in cup 16, as shown in FIGURE 2, the sugar is uniformly dissolved and, as can be seen from FIGURE 3, there are no portions broken away from the sugar block, due to the fact that stick portion 12 projects substantially throughout the entire length of block 14, and serves as a reinforcement therefor.

It is preferred to package the stick and sugar in a closed wrapper 17, as shown in FIGURE 4, and the wrapper, which may also be crimped at ends 24 and 25, may be imprinted with advertising matter 18, if desired. Thus, the sterile sugar is served with the beverage, and no separate spoon or sugar container are required. This is particularly advantageous when the beverage is carried outdoors, for example, to a car.

As brought out previously, it is necessary to have a cylindrically-shaped stick anchoring portion 12 to avoid crumbling of the block on forming. As shown in FIGURE 5, stick 10 has a rounded embedded portion 12 disposed within sugar block 14. The upper portion 11 of the plastic stick is preferably flat, and it may contain an advertisement 19, if desired. It will be noted that in all cases the embedded portion 12 of the stick extends substantially through the entire length of block 14, it being desirable to leave a small portion of sugar merely to cover the terminus 20 of stick portion 12.

To prevent any possibility of slipping off of block 14 from the surface of rounded stick portion 12, the latter portion of stick 10 may be provided with one or more peripherally (or radially) extending ribs 21, 22 and 23, as shown in FIGURE 6.

The pressure-forming operation is preferably carried out in a rotary press having stages, such as those outlined in FIGURES 7–15. For example, the die parts are first sprayed with lubricant, as shown in FIGURES 14–15, by sliding in spray tube 46, and spraying a fine mist 47 of lubricant over the die surfaces with which the sugar composition will come into contact. Then spray tube 46 is withdrawn, and stick 10 may be dropped into cavity 30 of die 31, with cylindrical portion 12 of the stick positioned in the forming cavity 32, so that it will be centrally disposed within the formed sugar block. In the next stage (FIG. 8), a guide bar 33 slides in channel 34 over the handle portion 11 of stock 10, and thus holds the stick in place and also seals off cavity 30, and becomes the back wall for cavity 32. Thereafter as cavity 32 slides under powder feeder 45, sugar composition 35 is poured into cavity 32, and a doctor blade 36 operated by rams 37 scrape off excess sugar 38 from over cavity 32, the excess sugar flowing out through an opening in the bottom of bin 39, so that, thereafter, cavity 32 is filled to the measured volume 40, as in FIGURE 10.

The next step (FIG. 11) involves a downward movement of punch 41 to compress the sugar to the desired shape and volume 14, after which, punch 41 is raised by an upward movement of lower punch 42 (after guide bar 33 has been slid out of the way). This lifts the finished handle-anchored sugar block 10 above the surface of press 31 (FIG. 12), making it possible for knock off arm 43 (FIG. 13) to push sugared stick 10 out of the way of the press, and thus enable the beginning of a new cycle.

An example of the following composition may be prepared and mixed together:

| | Parts by weight |
|---|---|
| Dry cane sugar, crystalline | 91.0 |
| Dry invert sugar, powdered | 9.0 |

The mixture is fed to a rotary press cavity in which is inserted the cylindrical end of a stick, such as that shown in FIGURE 5, and a punch pressure of 15 tons per square inch is applied to the sugar composition, whereupon a stick, similar to that shown in FIGURE 1, is obtained. A block thus obtained was found free of cracks and chips, and a hardness test on the Strong Cobb-Arner testing machine showed that the sugar block was able to withstand 48.5 kg. prior to breaking. Hot water (160°) solubility of the block was 12 seconds, and cold water (32°) solubility was 62 seconds, by the U.S.P. solubility method. The dry powder used was of commercial grade and was not specially dried.

Cane sugar suitable for this invention can be a dry crystalline sugar of about 10 mesh up to 325 mesh, or it may be a dry granulated sugar of, for example, 4X, 6X or 10X grade. For the needle-crystal sugar, one can employ dry commerical powdered glucose, dextrose invert, or the like. A suitable dry mixture, containing cane sugar and about 9% by weight of invert suger, is sold under the name of "Nulofond." As lubricants, calcium and/or magnesium stearates have been found best. The preferred composition range for needle-crystalline sugar is about 5% to about 10% by weight, and for lubricant, the preferred concentration in the spray liquid is about 1.0% to about 7% by weight. The spraying is preferably done before each block-forming operation. Preferred punch-pressures are about 8 to about 20 tons per square inch.

The term "cane sugar" employed herein shall be understood to include all forms of sucrose, whether they be obtained from cane, beets, or any other source. It is also to be understood that the sugar composition can contain small quantities of other dry ingredients, such as certified food colors, flavorings, and the like.

We claim:
1. A process for producing a handle-anchored formed sugar block designed to be used for stirring a beverage in a container, comprising:
   coating a press die cavity and punch with a film of lubricant,
   inserting into said press cavity a stick having a flat handle portion and a cylindrical portion,
   sealing off the handle portion,
   pouring around the cylindrical portion a dry powder mixture comprising cane sugar crystals containing about 3% to about 20% by weight of a dry edible sugar in needle crystal form, and
   compressing said mixture around said cylindrical portion to form a block in a manner such that said latter stick portion extends substantially completely through the entire length of said block and said block exhibits a hardness value of at least about 10 kg. as determined by the Strong Cobb-Arner hardness tester.

References Cited

UNITED STATES PATENTS

| 1,668,524 | 5/1928 | Bogue | 99—138 |
| 2,807,559 | 9/1957 | Steiner | 127—30 |
| 2,851,361 | 9/1958 | Diller | 99—78 |
| 3,312,555 | 4/1967 | Rossi et al. | 99—138 |

FOREIGN PATENTS

| 655,333 | 1/1963 | Canada. |

Arthur Little and K. A. Mitchell: "Tablet Making," 1949, pp. 48–50.

A. LOUIS MONACELL, Primary Examiner

WILLIAM C. LAWTON, Assistant Examiner

U.S. Cl. X.R.

127—29